US011799335B2

(12) United States Patent
Yageta et al.

(10) Patent No.: US 11,799,335 B2
(45) Date of Patent: Oct. 24, 2023

(54) ROTOR AND MANUFACTURING METHOD THEREOF

(71) Applicant: TOYOTA JIDOSHA KABUSHIKI KAISHA, Toyota (JP)

(72) Inventors: Ayumu Yageta, Toyota (JP); Hiroshi Kimpara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 17/395,710

(22) Filed: Aug. 6, 2021

(65) Prior Publication Data
US 2022/0060068 A1 Feb. 24, 2022

(30) Foreign Application Priority Data
Aug. 18, 2020 (JP) .................... 2020-138070

(51) Int. Cl.
*H02K 9/22* (2006.01)
*H02K 1/276* (2022.01)
*H02K 15/03* (2006.01)

(52) U.S. Cl.
CPC .............. *H02K 1/276* (2013.01); *H02K 9/22* (2013.01); *H02K 15/03* (2013.01)

(58) Field of Classification Search
CPC ............ H02K 1/276; H02K 9/22; H02K 1/27; H02K 1/279; H02K 9/223; H02K 15/03
USPC .................................................... 310/156.08
See application file for complete search history.

(56) References Cited

U.S. PATENT DOCUMENTS

| | | | | |
|---|---|---|---|---|
| 4,939,398 A | * | 7/1990 | Lloyd .................... | H02K 21/46 310/43 |
| 2004/0140875 A1 | * | 7/2004 | Strom ................... | H01F 7/0231 335/306 |
| 2009/0179506 A1 | * | 7/2009 | Saga ....................... | H02K 9/223 310/215 |
| 2011/0181130 A1 | * | 7/2011 | Yoshida ................ | H02K 9/227 310/12.29 |

(Continued)

FOREIGN PATENT DOCUMENTS

| JP | 2001-121400 A | 5/2001 |
|---|---|---|
| JP | 2006-002144 A | 1/2006 |

(Continued)

OTHER PUBLICATIONS

Excerpt from Henry's Student's Notebook, Method of Making Magnets, 1800's, https://commons.princeton.edu/josephhenry/permanent-magnet/, web page captured on Sep. 21, 2021, (Year: 1800).*

(Continued)

*Primary Examiner* — Quyen P Leung
*Assistant Examiner* — Masoud Vaziri
(74) *Attorney, Agent, or Firm* — Oliff PLC (57) ABSTRACT

A rotor includes: a rotor core in a shape of a shaft; a permanent magnet; and a connecting member interposed between the rotor core and the permanent magnet and connecting the permanent magnet to the rotor core. The connecting member contains a thermally conductive filler made of a non-magnetic material. Only ends of the filler have magnetism, and the ends are in contact with either or both of the rotor core and the permanent magnet.

3 Claims, 7 Drawing Sheets

(56) References Cited

U.S. PATENT DOCUMENTS

| | | | |
|---|---|---|---|
| 2014/0111050 A1* | 4/2014 | Chamberlin | H02K 9/223 |
| | | | 29/598 |
| 2014/0132094 A1* | 5/2014 | Chamberlin | H02K 9/223 |
| | | | 29/598 |
| 2015/0130318 A1* | 5/2015 | Kitada | H02K 15/03 |
| | | | 523/466 |
| 2015/0204737 A1* | 7/2015 | Moran | G01L 1/122 |
| | | | 29/428 |
| 2016/0203898 A1* | 7/2016 | Johnson | B05D 7/14 |
| | | | 335/302 |
| 2018/0316246 A1* | 11/2018 | Andonian | H02K 1/278 |
| 2019/0006099 A1* | 1/2019 | Kobayashi | B29C 45/17 |
| 2020/0067384 A1* | 2/2020 | Kinpara | H02K 1/28 |
| 2020/0244144 A1* | 7/2020 | Arai | H02K 9/223 |
| 2021/0336498 A1* | 10/2021 | Kummeth | H02K 55/04 |

FOREIGN PATENT DOCUMENTS

| | | | |
|---|---|---|---|
| JP | 2009-266913 A | | 11/2009 |
| JP | 2015109772 A | * | 6/2015 |
| JP | 2017009959 A | * | 1/2017 |
| JP | 2019-014232 A | | 1/2019 |
| JP | 2020-031499 A | | 2/2020 |

OTHER PUBLICATIONS

JP-2015109772-A—machine-translation (Year: 2015).*
JP-2017009959-A—machine-translation (Year: 2017).*

* cited by examiner

ROTOR AND MANUFACTURING METHOD THEREOF

CROSS-REFERENCE TO RELATED APPLICATION

This application claims priority to Japanese Patent Application No. 2020-138070 filed on Aug. 18, 2020, incorporated herein by reference in its entirety.

BACKGROUND

1. Technical Field

The disclosure relates to rotors mounted on a motor and methods for manufacturing a rotor.

2. Description of Related Art

A rotor is known which includes a rotor core in the shape of a shaft, permanent magnets fixed to the rotor core, and connecting members interposed between the rotor core and the permanent magnets and connecting the permanent magnets to the rotor core, the connecting members containing a thermally conductive filler (see, e.g., Japanese Unexamined Patent Application Publication No. 2006-002144 (JP 2006-002144 A).

SUMMARY

In the above rotor, the connecting member contains the thermally conductive filler in order to efficiently transfer heat generated in the permanent magnet to the rotor core. However, the connecting member is present between the filler and the rotor core or between the filler and the permanent magnet. Therefore, the heat generated in the permanent magnet is not dissipated directly to the rotor core via the filler but is dissipated to the rotor core via the filler and the connecting member. This configuration may reduce heat dissipation properties and thus may reduce cooling performance of the permanent magnet.

Aspects of the disclosure provides a rotor and a manufacturing method thereof that improve the cooling performance of a permanent magnet.

A first aspect of the disclosure relates to a rotor.

The rotor includes: a rotor core in a shape of a shaft; a permanent magnet; and a connecting member interposed between the rotor core and the permanent magnet and connecting the permanent magnet to the rotor core.

The connecting member contains a thermally conductive filler, only ends of the filler having magnetism and a portion of the filler other than the ends being made of a non-magnetic material.

The ends are in contact with either or both of the rotor core and the permanent magnet.

The filler may be oriented in a heat dissipation direction of the permanent magnet.

One of the ends of the filler may be in contact with the rotor core, and the other end of the filler may be in contact with the permanent magnet.

A longitudinal length of the filler may be equal to or greater than a distance between the rotor core and the permanent magnet.

A second aspect of the disclosure relates to a method for manufacturing a rotor.

The method for manufacturing a rotor including a rotor core in a shape of a shaft, a permanent magnet, and a connecting member interposed between the rotor core and the permanent magnet and connecting the permanent magnet to the rotor core includes: magnetizing ends of a thermally conductive filler made of a non-magnetic material; producing the connecting member mixed with the filler having the magnetized ends; and connecting the rotor core and the permanent magnet via the connecting member mixed with the filler and bringing the ends of the filler into contact with either or both of the rotor core and the permanent magnet.

The ends of the filler may be magnetized by cutting or bending the filler.

According to the aspects of the disclosure, a rotor and a manufacturing method thereof that improve the cooling performance of a permanent magnet can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
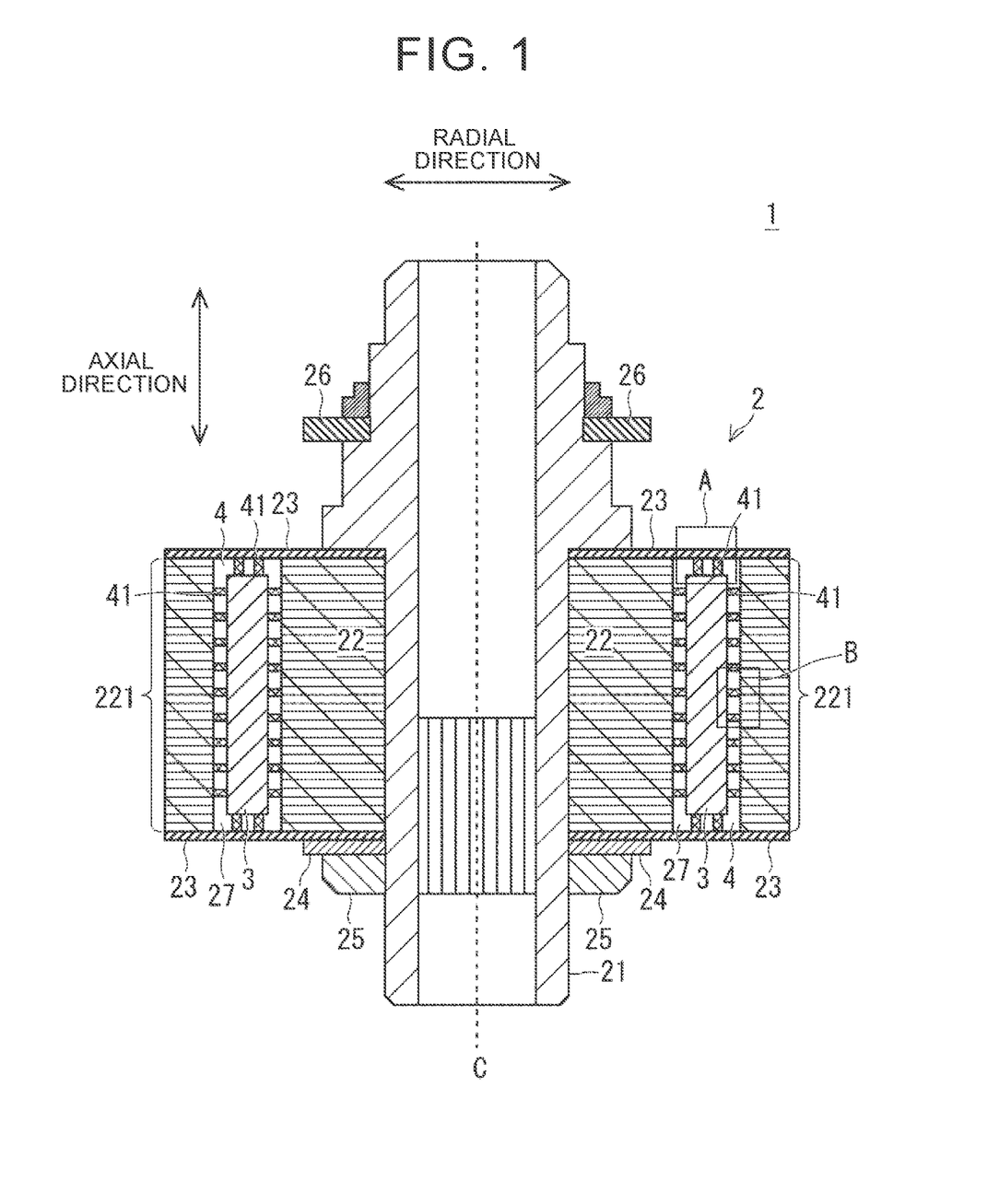
FIG. 1 is a sectional view illustrating a general configuration of a rotor according to a first embodiment.

Embodiments of the disclosure will be described below with reference to the drawings. FIG. 1 is a sectional view illustrating a general configuration of a rotor according to a first embodiment. A rotor 1 according to the first embodiment is mounted in a motor for driving, e.g., an electric vehicle, a hybrid vehicle, etc. The rotor 1 rotates about a central axis C. The rotor 1 includes a rotor core 2 generally in the shape of a shaft, permanent magnets 3, and connecting members 4 interposed between the rotor core 2 and the permanent magnets 3 and connecting the permanent magnets 3 to the rotor core 2. As described above, the permanent magnets 3 are fixed to the rotor core 2 via the connecting members 4.

The rotor core 2 has a shaft 21, a cylindrical laminated core 22 connected to the shaft 21, and a pair of end plates 23 that fixes the laminated core 22.

The laminated core 22 is formed by stacking a plurality of annular, plate-like laminated steel sheets 221 in the axial direction. As used herein, the axial direction refers to a direction along the central axis C of the rotor 1, and the radial direction refers to a direction perpendicular to the central axis C. The laminated steel sheets 221 are electrical steel sheets with magnetism etc. Each of a pair of end plates 23 is placed on each end face of the laminated core 22 such that the laminated core 22 is sandwiched between the end plates 23. The end plates 23 are annular metal plates, and the outside diameter of the end plates 23 is set to be substantially equal to the outside diameter of the laminated core 22.

The shaft 21 is inserted into an axial through hole formed in the center of the laminated core 22 sandwiched between the end plates 23. The laminated core 22 and the end plates 23 are integrally connected to the shaft 21 by tightening a nut 25 on threads formed on one end of the shaft 21 with a washer 24 between the nut 25 and the end plate 23. For example, a resolver 26 that detects rotation of the shaft 21 is connected to the shaft 21 by a nut etc.

The rotor core 2 according to the first embodiment is configured as an interior permanent magnet (IPM) rotor core in which the permanent magnets 3 are embedded in the laminated core 22. The cylindrical laminated core 22 has a plurality of slots 27 formed near its outer periphery at predetermined intervals in the circumferential direction. The slots 27 extend through the laminated core 22 in the axial direction.

A resin 4 is molded around each permanent magnet 3. The permanent magnets 3 each covered by the molded resin 4 are fixed in the slots 27. The permanent magnets 3 are thus fixed in the slots 27 via the resin 4. The end plates 23 serve to restrict axial movement of the permanent magnets 3 covered by the molded resin 4 in the slots 27 of the laminated core 22.

The resin 4 is a specific example of the connecting member that connects the permanent magnet 3 to the laminated core 22 of the rotor core 2. The resin 4 may be composed of epoxy, phenol, polyimide, etc. However, the disclosure is not limited to this, and the resin 4 may be composed of silicone, styrene, polyethylene, phenol, etc.

As shown in FIG. 1, the resin 4 is present between the inner wall surface of each slot 27 and the outer surface of each permanent magnet 3. The resin 4 is also present between each axial end face of the permanent magnet 3 and each end plate 23. For example, when a large current is passed through the motor to rotate the motor at high speeds, a large induced current may flow through the permanent magnets 3, the permanent magnets 3 may generate heat, and the heat may demagnetize the permanent magnets 3.

In order to effectively reduce such demagnetization of the permanent magnets 3, the resin 4 according to the first embodiment contains thermally conductive fillers 41. Accordingly, the heat of the permanent magnets 3 is dissipated to the end plates 23 and the laminated core 22 mainly through the thermally conductive fillers 41 in the resin 4, and the permanent magnets 3 are thus cooled.

The fillers 41 according to the first embodiment are made of a non-magnetic material. Only ends 411 of the fillers 41 have magnetism, and the ends 411 are in contact with the rotor core 2 or the permanent magnet 3. Since only the ends 411 of the fillers 41 have magnetism, orientation of the fillers 41 can be easily adjusted by using, e.g., an electromagnet etc., so that the ends 411 can be brought into contact with the rotor core 2 or the permanent magnet 3.

As the ends 411 of the fillers 41 are in contact with the rotor core 2 or the permanent magnet 3, thermal conductive properties between the fillers 41 and the rotor core 2 or the permanent magnet 3 are significantly improved. Heat dissipation properties of the fillers 41 are thus improved and cooling performance of the permanent magnets 3 is improved.

It is more preferable that the ends 411 of the fillers 41 be in contact with the permanent magnet 3. The heat generated in the permanent magnet 3 is thus more quickly conducted to the fillers 41, and the cooling performance of the permanent magnet 3 is improved.

The fillers 41 are made of a non-magnetic material, and only the ends 411 of the fillers 41 have magnetism. Accordingly, even when the fillers 41 are in contact with the permanent magnet 3 or the laminated steel sheets 221 of the laminated core 22 of the rotor core 2, it will not affect the behavior of a vortex flux such as a decrease in vortex flux density, and a decrease in output of the motor is effectively reduced.

The fillers 41 may be composed of an austenitic stainless steel that is a non-magnetic material, such as SUS304 that is an 18 chromium-8 nickel austenitic stainless steel. The fillers 41 are linear members with a predetermined length. More specifically, the diameter of the fillers 41 is about 20 μm, the longitudinal length of the fillers 41 is about 0.2 mm, and the length of the magnetic ends 411 of the fillers 41 is about 0.2 μm.

Figure 2:
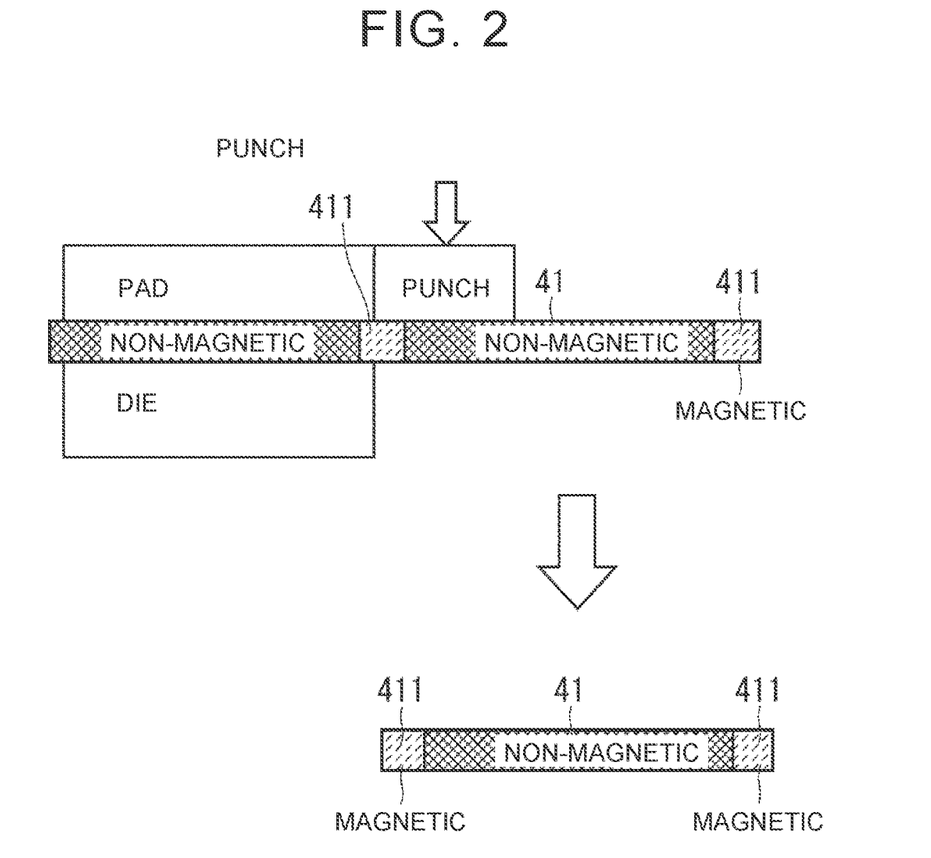
FIG. 2 illustrates a method for magnetizing only ends of a filler made of a non-magnetic material.

FIG. 2 illustrates a method for magnetizing only the ends of the filler made of a non-magnetic material. For example, the linear filler 41 wound around a bobbin etc. is first pulled out by a predetermined length. Next, as shown in FIG. 2, the root side of the filler 41 thus pulled out is held and fixed between a pad and a die, and the tip side of the filler 41 is pushed with a punch to cut the filler 41. This process is repeated.

When cutting the filler 41, the end 411 that is a cut part of the filler 41 is subjected to stress, and only the end 411 subjected to the stress is transformed from non-magnetic austenite to magnetic martensite (deformation-induced martensite). Since only the end 411 of the filler 41 can thus be magnetized simultaneously with cutting the filler 41, processing cost of the fillers 41 is reduced.

In the first embodiment, as described above, since only the ends 411 of the fillers 41 are magnetized using the deformation induction, the fillers 41 are composed of the austenitic SUS304. However, the disclosure is not limited to this. The fillers 41 may be composed of any material as long as the fillers 41 are made of a non-magnetic material and only the ends 411 of the fillers 41 have magnetism. For example, the fillers 41 may be composed of a non-magnetic material such as $SiO_2$, $Al_2O_3$, h-BN, c-BN, AlN, $Si_3N_4$, or BeO. In this case, only the ends 411 of the fillers 41 may be magnetized by applying magnetic powder such as iron or ferrite only to the ends 411 of the fillers 41.

In the first embodiment, the fillers 41 are linear members. However, the disclosure is not limited to this. The fillers 41 may have, e.g., an elliptical shape, a strip shape, a helical shape, a ring shape, etc. as long as the orientation of the fillers 41 can be adjusted using the magnetized ends 411.

In the first embodiment, the end 411 of the filler 41 is magnetized using the stress applied to the end 411 when cutting the filler 41. However, the disclosure is not limited to this. For example, a bent part of the filler 41 may be magnetized using plastic deformation that occurs when bending the filler 41, and the bent part of the filler 41 may serve as the magnetized end 411. In this case, the filler 41 may be formed in, e.g., a U-shape, an L-shape, an S-shape, a C-shape, a V-shape, etc.

Figure 3:
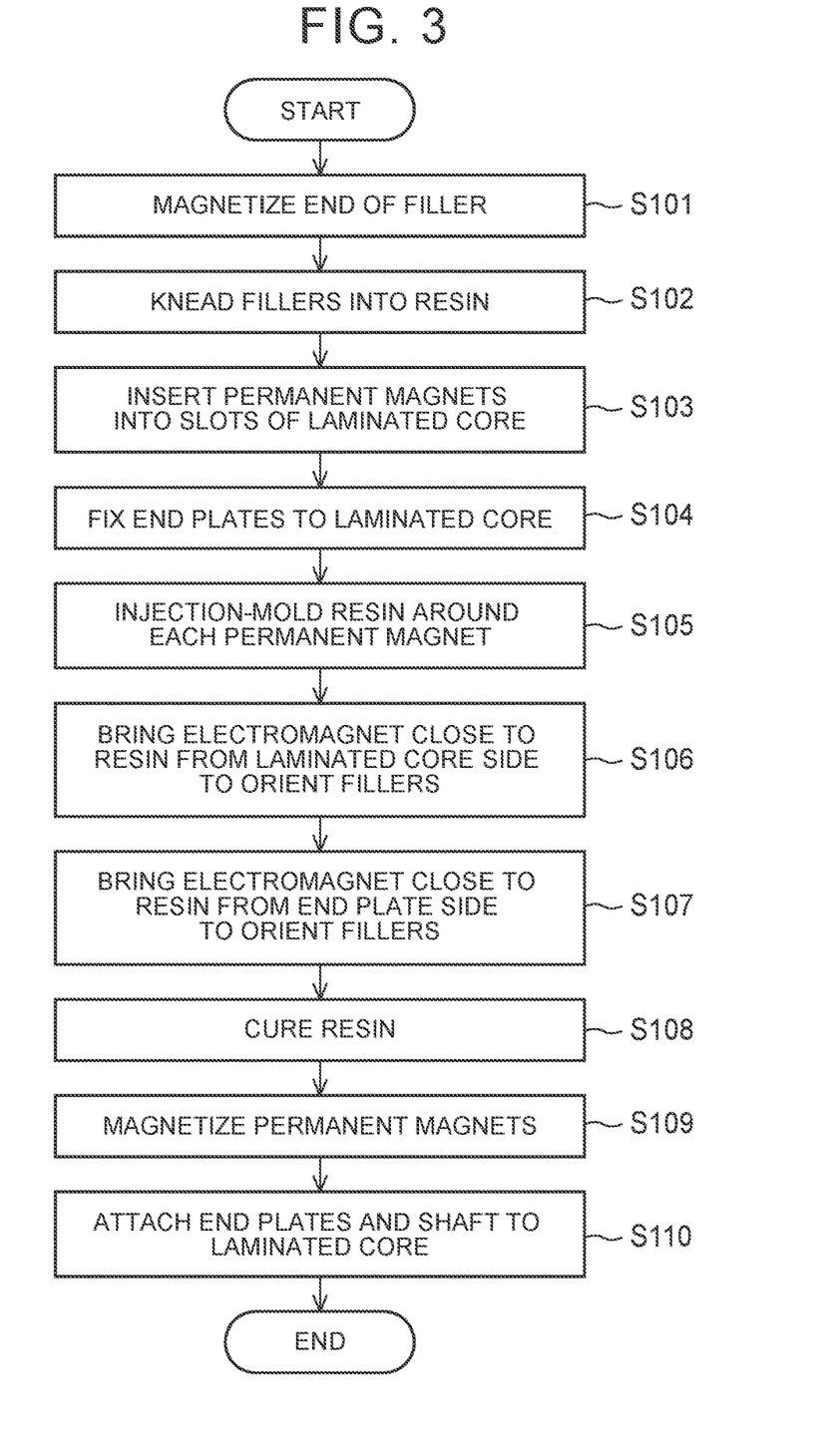
FIG. 3 is a flowchart of a method for manufacturing a rotor according to the first embodiment.

Next, a method for manufacturing the rotor 1 according to the first embodiment will be described in detail. FIG. 3 is a flowchart of the method for manufacturing the rotor 1 according to the first embodiment.

First, the linear filler 41 is cut to a predetermined length to magnetize the end 411 of the filler 41 (step S101). The magnetized fillers 41 are kneaded into the resin 4 to obtain a kneaded material (step S102).

The permanent magnets 3 are inserted into the slots 27 of the laminated core 22 (step S103). The end plates 23 are fixed to both end faces of the laminated core 22 by welding etc (step S104). The resin 4 containing the fillers 41 is injection-molded around each of the permanent magnets 3 in the slots 27 of the laminated core 22 (step S105).

An electromagnet is brought close to the injection-molded resin 4 from the outside of the laminated core 22 (step S106). As a result, the fillers 41 are oriented in the heat dissipation direction (radial direction), and the ends 411 of the fillers 41 are attracted to the electromagnet and brought into contact with the laminated steel sheets 221 of the laminated core 22.

Similarly, an electromagnet is brought close to the injection-molded resin 4 from the outside of each end plate 23 (step S107). As a result, the fillers 41 are oriented in the heat dissipation direction (axial direction), and the ends 411 of the fillers 41 are attracted to the electromagnet and brought into contact with the end plates 23.

The resin 4 is thermally cured (step S108). The permanent magnets 3 are magnetized (step S109). The end plates 23 and the shaft 21 are attached to the laminated core 22 and tightened with a nut (step S110).

In the manufacturing method according to the first embodiment, the resin 4 containing the fillers 41 may be molded around each permanent magnet 3, and the fillers 41 in the molded resin 4 may be oriented by an electromagnet etc. The resin 4 and the permanent magnets 3 may subsequently be inserted into the slots 27 of the laminated core 22.

The permanent magnets 3 may be magnetized in advance before, e.g., being inserted into the slots 27 of the laminated core 22. In this case, an electromagnet is brought close to the injection-molded resin 4 to orient the fillers 41 in the heat dissipation direction, and the ends 411 of the fillers 41 are attracted toward and brought into contact with the permanent magnets 3 in the slots 27 by the magnetic force of the permanent magnets 3.

The permanent magnets 3 may be magnetized after the resin 4 containing the fillers 41 is injection-molded around each of the permanent magnets 3 in the slots 27 of the laminated core 22 (step S105). In this case, the ends 411 of the fillers 41 are attracted toward and brought into contact with the permanent magnets 3 by the magnetic force of the permanent magnets 3. The resin 4 is then thermally cured. This process eliminates the above steps of bringing an electromagnet close to the resin 4 (S106, S107).

As described above, in the first embodiment, the resin 4 contains the thermally conductive fillers 41 made of a non-magnetic material, and only the ends 411 of the fillers 41 have magnetism. Accordingly, orientation of the fillers 41 can be easily adjusted using an electromagnet etc. and the ends 411 can be brought into contact with the rotor core 2 or the permanent magnet 3. As the ends 411 of the fillers 41 are in contact with the rotor core 2 or the permanent magnet 3, the thermal conductive properties between the fillers 41 and the rotor core 2 or the permanent magnet 3 is significantly improved. The heat dissipation properties of the fillers 41 are thus improved and the cooling performance of the permanent magnets 3 is improved.

Second Embodiment

Figure 4:
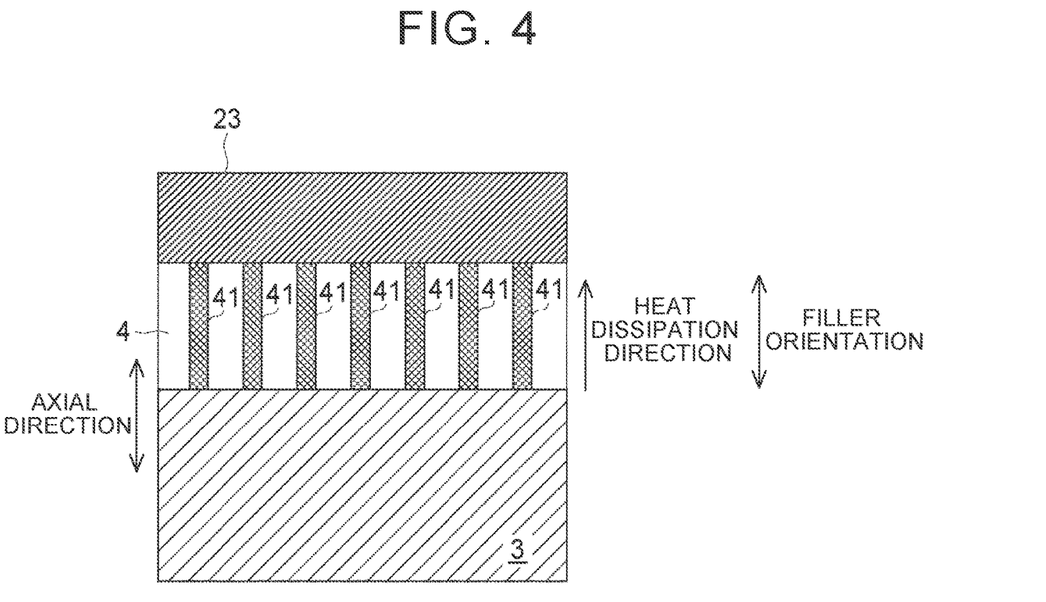
FIG. 4 is an enlarged view of a portion A in FIG. 1.
Figure 5:
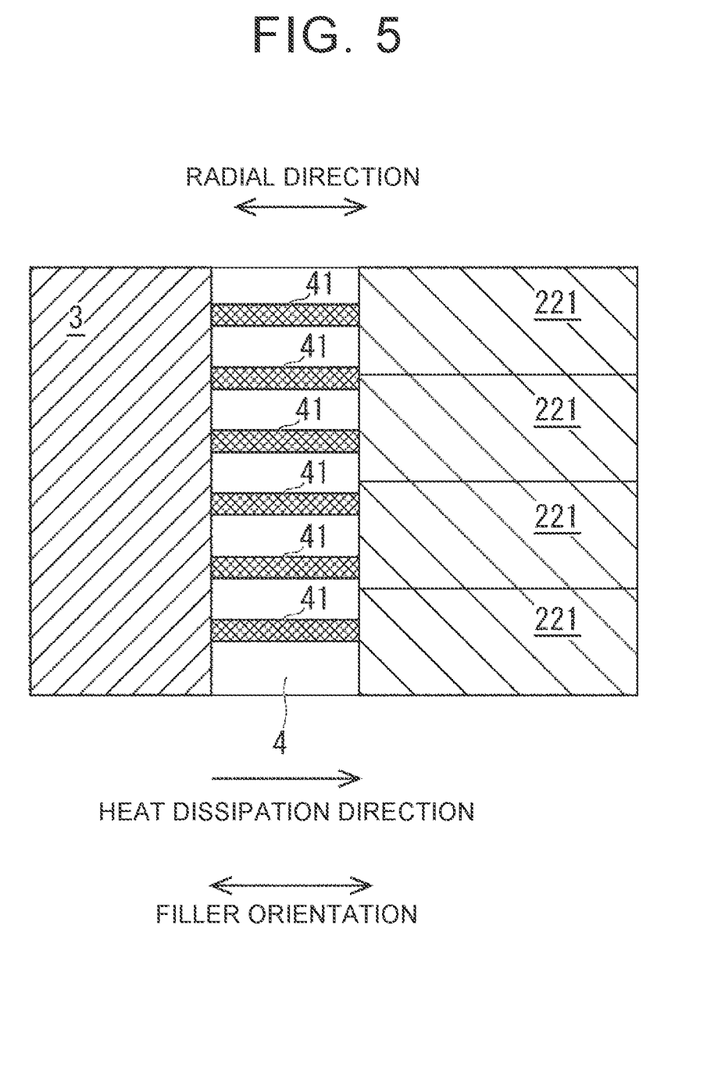
FIG. 5 is an enlarged view of a portion B in FIG. 1.

In a second embodiment, one ends of the fillers 41 are in contact with the rotor core 2, and the other ends of the fillers 41 are in contact with the permanent magnet 3. FIG. 4 is an enlarged view of a portion A in FIG. 1. As shown in FIG. 4, one ends of the fillers 41 are in contact with the permanent magnet 3 and the other ends of the fillers 41 are in contact with the end plate 23 of the rotor core 2. FIG. 5 is an enlarged view of a portion B in FIG. 1. As shown in FIG. 5, one ends of the fillers 41 are in contact with the permanent magnet 3 and the other ends of the fillers 41 are in contact with each laminated steel sheet 221 of the laminated core 22 of the rotor core 2.

As one ends of the fillers 41 are in contact with the rotor core 2 and the other ends of the fillers 41 are in contact with the permanent magnet 3, thermal conductive properties between the fillers 41 and the rotor core 2 and between the fillers 41 and the permanent magnet 3 are significantly improved. The heat dissipation properties of the fillers 41 are thus improved and the cooling performance of the permanent magnets 3 is improved.

For example, the thermal conductivity of the end plates 23 and the laminated core 22 (iron) is 80.4 W/mk, and the thermal conductivity of the fillers 41 (SUS) is 18 to 20 W/mk. On the other hand, the thermal conductivity of the resin 4 (epoxy) is 0.3 W/mk. As described above, the thermal conductivity of the resin 4 is significantly lower than the thermal conductivity of the end plates 23, the laminated core 22 and the fillers 41.

Since both ends of the fillers 41 are in contact with the permanent magnet 3 and the end plate 23 and in contact with the permanent magnet 3 and each laminated steel sheet 221 with no resin 4 interposed between the fillers 41 and the permanent magnet 3, between the fillers 41 and the end plate 23, and between the fillers 41 and each laminated steel sheet 221, the thermal conductivity for the heat generated in the permanent magnet 3 is significantly improved, and heat dissipation efficiency is further improved.

Third Embodiment

In a third embodiment, the predetermined longitudinal length of the fillers 41 is greater than the distance between the permanent magnet 3 and the laminated steel sheet 221 and the distance between the permanent magnet 3 and the end plate 23 (In FIGS. 4 and 5, for simplicity, the predetermined longitudinal length of the fillers 41 is shown equal to the distance between the permanent magnet 3 and the laminated steel sheet 221 and the distance between the permanent magnet 3 and the end plate 23). The distance between the permanent magnet 3 and the laminated steel sheet 221 and the distance between the permanent magnet 3 and the end plate 23 are equal to the thickness of the resin 4.

As shown in FIGS. 4 and 5, both ends of the fillers 41 can thus be reliably brought into contact with the permanent magnet 3 and the end plate 23 and with the permanent magnet 3 and each laminated steel sheet 221, respectively.

Each filler 41 in the resin 4 is preferably oriented in the heat dissipation direction of the permanent magnet 3. Heat conduction increases in the direction in which the fillers 41 are oriented. Accordingly, as shown in FIG. 5, the fillers 41 in the resin 4 are oriented such that the longitudinal direction of the fillers 41 extends in the radial direction. Each filler 41 in the resin 4 transfers heat generated in the permanent magnet 3 to the laminated core 22 located outward of the permanent magnet 3 in the radial direction and transfers the heat from the outer peripheral surface of the laminated core 22 to the outside. The heat of the permanent magnet 3 is thus efficiently transferred outward in the radial direction.

Similarly, as shown in FIG. 4, the fillers 41 in the resin 4 are oriented such that the longitudinal direction of the fillers 41 extends in the axial direction. Each filler 41 in the resin 4 transfers heat generated in the permanent magnet 3 to the end plate 23 located outward of the permanent magnet 3 in the axial direction and transfers the heat from the surface of the end plate 23 to the outside. The heat of the permanent magnet 3 is thus efficiently transferred outward in the axial direction.

Figure 6:
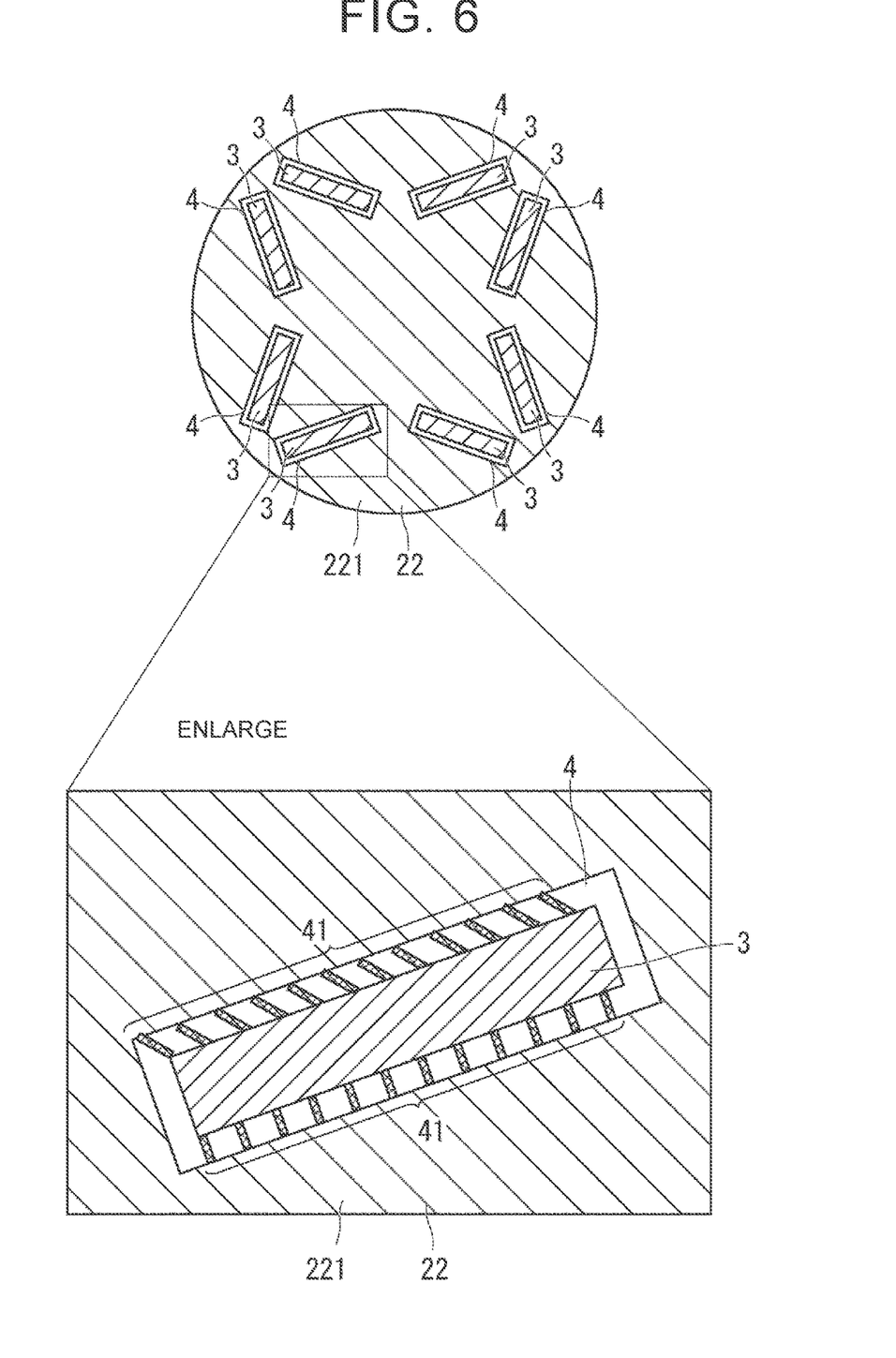
FIG. 6 illustrates an example of filler orientation.

FIG. 6 illustrates an example of filler orientation. As shown in FIG. 6, the fillers 41 are oriented perpendicular to the surface of the permanent magnet 3. Accordingly, heat generated in the permanent magnet 3 can be conducted to the laminated steel sheets 221 of the laminated core 22 or the end plate 23 in the shortest distance, and the heat dissipation efficiency is improved. A part or all of the fillers 41 may be oriented obliquely to the surface of the permanent magnet 3 as long as the ends 411 of the fillers 41 are in contact with either or both of the permanent magnet 3 and the laminated steel sheets 221.

Fourth Embodiment

FIGS. 7A to 7F illustrate an example of a method for manufacturing a rotor according to a fourth embodiment. A rotor core according to the fourth embodiment is configured as a surface permanent magnet (SPM) rotor core in which permanent magnets 30 are attached to the surface of a laminated core 50.

Figure 7A:
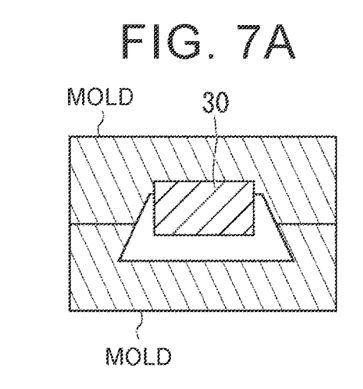
FIG. 7A illustrates an example of a method for manufacturing a rotor according to a fourth embodiment.
Figure 7B:
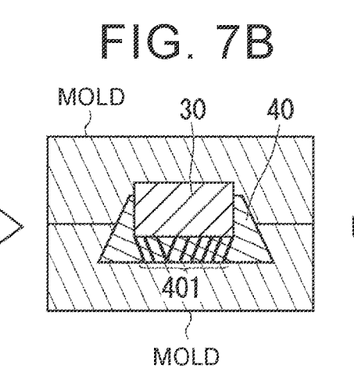
FIG. 7B illustrates an example of a method for manufacturing a rotor according to a fourth embodiment.

As shown in FIGS. 7A to 7F, the permanent magnet 30 is first placed in a mold (FIG. 7A). A resin 40 containing fillers 401 is injected into the mold to mold the resin 40 around the permanent magnet 30 (FIG. 7B). At this time, the fillers 401 are oriented in random directions.

Figure 7C:
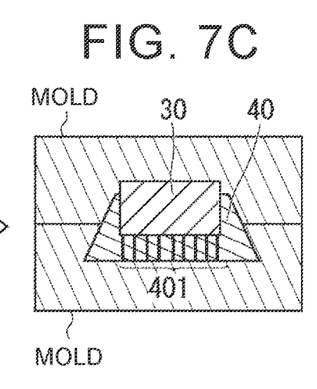
FIG. 7C illustrates an example of a method for manufacturing a rotor according to a fourth embodiment.

An electromagnet is brought close to the injection-molded resin 40 from the outside of the mold. As a result, the fillers 401 are oriented in the heat dissipation direction, and one ends of the fillers 401 are attracted to the electromagnet and brought into contact with the permanent magnet 30 (FIG. 7C).

Figure 7D:
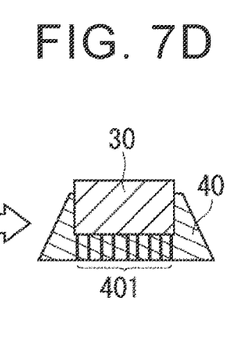
FIG. 7D illustrates an example of a method for manufacturing a rotor according to a fourth embodiment.
Figure 7E:
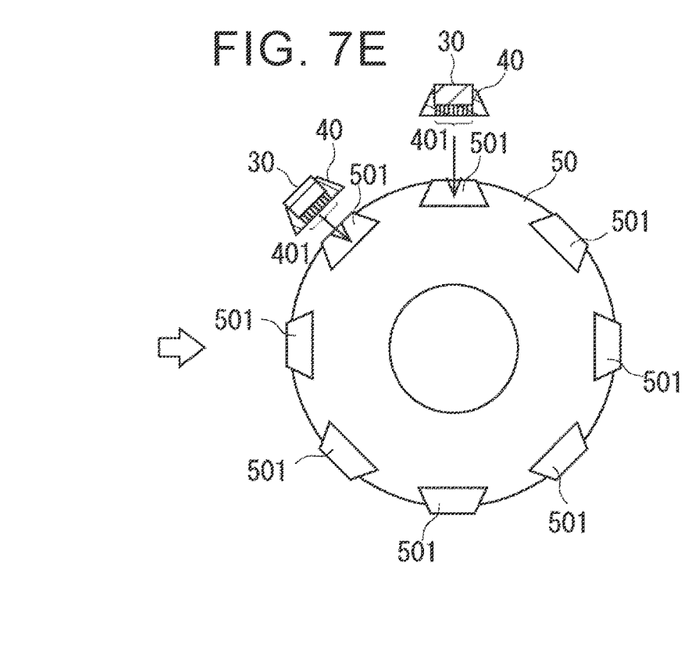
FIG. 7E illustrates an example of a method for manufacturing a rotor according to a fourth embodiment.
Figure 7F:
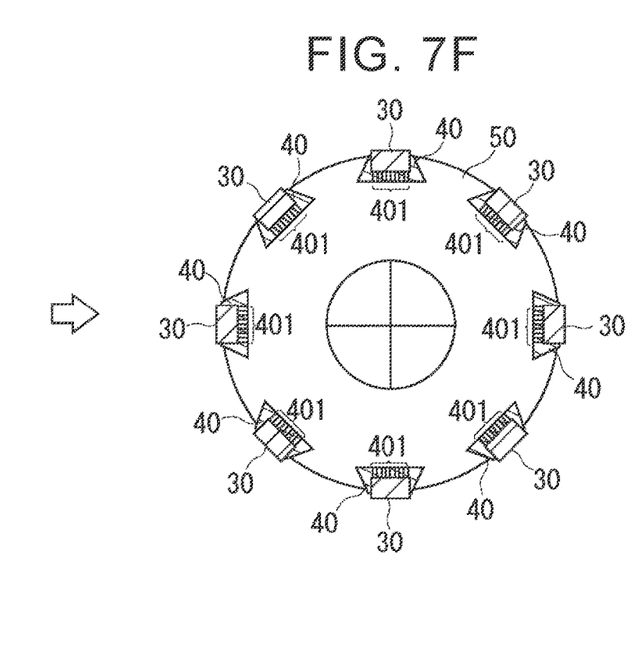
FIG. 7F illustrates an example of a method for manufacturing a rotor according to a fourth embodiment.

The mold is removed from the permanent magnet 30 with the resin 40 molded thereon (FIG. 7D). The permanent magnets 30 with the resin 40 molded thereon are inserted into slots 501 of the laminated core 50 in the axial direction (FIG. 7E). The other ends of the fillers 401 in the resin 40 are thus brought into contact with the laminated core 50 (FIG. 7F).

Fifth Embodiment

In a fifth embodiment, the fillers 41 are contained in a part of the resin. For example, the fillers 41 may be contained only in the resin 4 located between the permanent magnet 3 and the laminated core 22. When the rotor core 2 rotates at high speeds, a large centrifugal force is applied to the resin 4 located between the permanent magnet 3 and the laminated core 22. Accordingly, the fillers 41 may be contained only in the resin 4 between the permanent magnet 3 and the laminated core 22 to increase the strength. The strength of the resin 4 is thus improved while improving the cooling performance of the permanent magnets 3.

The amount of fillers 41 in the resin 4 may be increased in order to increase the strength of the resin 4. Increasing the amount of fillers 41 increases not only the strength of the resin 4 but also the thermal conductivity of the resin 4 and thus further improves the cooling performance. Both the strength and thermal conductivity of the resin 4 can also be increased by increasing the diameter of the fillers 41.

Although some embodiments of the disclosure have been described above, these embodiments are illustrated by way of example and are not intended to limit the scope of the disclosure. For example, in the embodiments, the connecting members 4 are produced by curing the resin mixed with the fillers 41. However, connecting members may be produced by solidifying a molten resin mixed with the fillers 41 by cooling. These novel embodiments can be carried out in various other forms, and various omissions, replacements, and changes can be made without departing from the spirit and scope of the disclosure. These embodiments and modifications thereof fall within the spirit and scope of the disclosure and also fall within the scope of the disclosure and its equivalent.

What is claimed is:

1. A method for manufacturing a rotor including a rotor core in a shape of a shaft, a permanent magnet, and a connecting member interposed between the rotor core and the permanent magnet and connecting the permanent magnet to the rotor core, the method comprising:
    magnetizing ends of a thermally conductive filler made of a non-magnetic material;
    placing the permanent magnet in a mold;
    injecting a resin containing the thermally conductive filler into the mold such that the resin is molded around the permanent magnet;
    bringing an electromagnet close to the resin containing the thermally conductive filler from an outside of the mold such that the thermally conductive filler is oriented, and then curing the resin;
    removing the mold from the permanent magnet with the resin containing the thermally conductive filler;
    inserting the permanent magnet with the resin containing the thermally conductive filler into one slot of the rotor core in an axial direction; and
    connecting the rotor core and the permanent magnet via the resin containing the thermally conductive filler and bringing the ends of the thermally conductive filler into contact with either or both of the rotor core and the permanent magnet.

2. The method according to claim 1, wherein the ends of the thermally conductive filler are magnetized by bending the thermally conductive filler.

3. The method according to claim 1, wherein the thermally conductive filler is provided only in the resin located between the permanent magnet and the rotor core.

* * * * *